United States Patent
Pflüger et al.

(10) Patent No.: US 12,266,841 B2
(45) Date of Patent: Apr. 1, 2025

(54) ANTENNA FOR MEASURING DIELECTRIC VALUES

(71) Applicant: Endress+Hauser Flowtec AG, Reinach (CH)

(72) Inventors: Stefan Pflüger, Munich (DE); Thilo Ihringer, Rheinfelden (DE)

(73) Assignee: Endress+Hauser Flowtec AG, Reinach (CH)

( * ) Notice: Subject to any disclaimer, the term of this patent is extended or adjusted under 35 U.S.C. 154(b) by 189 days.

(21) Appl. No.: 18/258,288

(22) PCT Filed: Nov. 26, 2021

(86) PCT No.: PCT/EP2021/083103
§ 371 (c)(1),
(2) Date: Jun. 19, 2023

(87) PCT Pub. No.: WO2022/128404
PCT Pub. Date: Jun. 23, 2022

(65) Prior Publication Data
US 2024/0055748 A1    Feb. 15, 2024

(30) Foreign Application Priority Data
Dec. 18, 2020 (DE) ..................... 10 2020 134 320.5

(51) Int. Cl.
*H01Q 13/06* (2006.01)
*H01P 5/103* (2006.01)

(52) U.S. Cl.
CPC ............. *H01P 5/103* (2013.01); *H01Q 13/06* (2013.01)

(58) Field of Classification Search
CPC ................................ H01A 13/06; H01Q 13/00
See application file for complete search history.

(56) References Cited

U.S. PATENT DOCUMENTS

| | | | |
|---|---|---|---|
| 3,478,282 A | 11/1969 | Smith | |
| 4,626,865 A * | 12/1986 | Rammos | H01Q 13/18 343/786 |
| 5,473,256 A | 12/1995 | Stafford et al. | |
| 5,883,603 A | 3/1999 | Kim | |
| 10,001,398 B2 * | 6/2018 | Blodt | G01F 23/2962 |

(Continued)

FOREIGN PATENT DOCUMENTS

| | | |
|---|---|---|
| DE | 2616217 A1 | 11/1977 |
| DE | 19617963 C2 | 3/1998 |
| DE | 102012105281 A1 | 12/2013 |

(Continued)

*Primary Examiner* — Awat M Salih
(74) *Attorney, Agent, or Firm* — Mark A. Logan; Endress+Hauser (USA) Holding, Inc.

(57) ABSTRACT

An antenna for high-frequency based measuring devices for determining a dielectric value of media is based on a high-frequency waveguide. The high-frequency signal is coupled in or out via a coaxial conductor that runs orthogonally through the axis of the high-frequency waveguide for this purpose. The conductor termination for the coaxial conductor extends extensively beyond the high-frequency waveguide in such a way that the coaxial conductor forms a defined capacitance in this region. In this way, the coaxial conductor is optimally matched to the high-frequency waveguide without having to integrate additional electrical components for this purpose.

13 Claims, 1 Drawing Sheet

(56) References Cited

U.S. PATENT DOCUMENTS

2005/0206473 A1* 9/2005 Martin ..................... H01P 1/08
333/33
2020/0067165 A1* 2/2020 Rogers ................... H01Q 13/06

FOREIGN PATENT DOCUMENTS

DE 102017130728 A1 6/2019
GB 2293014 A 3/1996
JP 57204605 A 12/1982

\* cited by examiner

ANTENNA FOR MEASURING DIELECTRIC VALUES

CROSS-REFERENCE TO RELATED APPLICATIONS

The present application is related to and claims the priority benefit of DPMA Patent Application No. 10 2020 134 320.5, filed on Dec. 18, 2020, and International Patent Application No. PCT/EP2021/083103, filed Nov. 26, 2021, the entire contents of which are incorporated herein by reference.

TECHNICAL FIELD

The invention relates to an antenna for high-frequency-based dielectric value measurement.

BACKGROUND

In automation technology, in particular for process automation, field devices are often used, which serve to detect various measured variables. The measured variable to be determined can be, for example, a fill level, a flow, a pressure, the temperature, the pH value, the redox potential, a conductivity, or the dielectric value of a medium in a processing plant. To detect the corresponding measured values, the field devices each comprise suitable sensors or are based on suitable measurement methods. A variety of various types of field devices is manufactured and marketed by the Endress+Hauser group of companies.

From the complex-valued dielectric value (also known as "dielectric constant" or "relative permittivity"), various measured variables of the present medium can be derived, such as the moisture content, the substance composition, or any impurities. Therefore, the determination of the dielectric value is of great interest both for solid-like media, such as cement or grains, as well as for liquid and gaseous media, such as fuels, wastewater, gases or chemicals, for example. In this case, the dielectric value can, in principle, be determined both in stored and in flowing media. Accordingly, the term "container" is defined in the context of the invention as a tank, a silo, a basin, or a section of pipeline, for example.

In addition to the inductive and capacitive measuring principle for determining the dielectric value, high-frequency-based measuring principles are primarily used. In this regard, the term "high frequency" in the context of this patent application refers to corresponding signals with frequencies between 0.03 GHz and 300 GHz. In addition to the TDR principle ("time domain reflectometry"), it is possible to determine the dielectric value by means of transmittive or reflective high-frequency measurement. In the case of the transmittive measuring principle, a high-frequency signal with a defined frequency or frequency change is coupled into a measuring path leading through the medium inside the container containing the medium to be examined. In this case, after passing through the measurement path, an amplitude/amplitude change and/or a phase/phase shift is measured in order to determine therefrom, for example, the possibly complex-valued dielectric value on the basis of corresponding calibration measurements. A transmittively operating dielectric value measuring device is described in more detail, for example, in the German publication DE 10 2017 130 728 A1.

Depending on the processing plant, various design requirements are placed on the antennas of high-frequency-based dielectric value measuring instruments, since the antennas may be the only components in direct contact with the medium: For example, the antennas must be resistant, on the one hand, to aggressive media, high pressures and high temperatures. Furthermore, if at all possible, the antennas may not protrude into the container. On the other hand, the antennas must display efficient high-frequency signal transmission behavior.

The British Patent GB 2 293 014 describes a waveguide-based antenna for high-frequency-based dielectric value determination. In this case, the waveguide is formed from a stainless steel body into which a glass-ceramic filling is fused. The glass filling gives the antenna a high resistance to the conditions in the container. However, the glass filling is associated with complex manufacturing. Furthermore, the antenna inevitably has a comparatively large volume, since glass ceramic has a comparatively low permittivity.

SUMMARY

The invention is therefore based on the purpose of providing an efficient antenna with high pressure and temperature resistance, which can be manufactured compactly and easily, for high-frequency dielectric value measurement.

The invention achieves this purpose by an antenna for emitting and/or receiving high-frequency signals which comprises at least the following components:
- a high-frequency waveguide, by means of which the high-frequency signal can be transmitted along a particularly rectilinear waveguide axis, with
  - a first end face that is oriented approximately orthogonally to the waveguide axis in order to transmit or receive the high-frequency signal, and with
  - a feedthrough extending approximately at right angles to the waveguide axis, for
- a coaxial conductor in order to couple the high-frequency signal to be transmitted into the high-frequency waveguide, or to tap the received high-frequency signal, with
  - an electrical outer conductor, which is electrically connected to the high-frequency waveguide,
  - a conductor termination designed in such a way that the high-frequency signal to be coupled in or tapped is reflected there, and
  - a connection means opposite the conductor termination for high-frequency contacting of the antenna.

According to the invention, the coaxial conductor extends far beyond the feedthrough so that the coaxial conductor forms a defined capacitance between the feedthrough and the conductor termination.

In this way, the coaxial conductor is optimally matched to the high-frequency waveguide in terms of high-frequency technology without having to integrate additional electrical components for this purpose. This results in an efficient high-frequency antenna, which can be easily manufactured due to its few components.

If the high-frequency waveguide and the coaxial conductor are structurally enclosed by a carrier body at least between the feedthrough and the conductor termination, it is possible to design the high-frequency waveguide as a all conductor by designing the carrier body as a negative shape of the high-frequency waveguide. In this case, the carrier body must be designed to be electrically conductive at least on the surface of this negative shape, provided that the carrier body is not manufactured completely from an electrically conductive material, such as a steel. As an alternative to a waveguide design, it is also conceivable to design the high-frequency waveguide as a dielectric waveguide.

Even if the high-frequency waveguide is designed as a waveguide, it is advantageous if the high-frequency waveguide is filled with a dielectric material which, at a corresponding frequency of the high-frequency signal, has a permittivity of at least 2, such as in particular, titanium oxide, aluminum oxide or zirconium oxide. As a result, the dimensions of the high-frequency waveguide can be significantly reduced compared to an air-filled waveguide. In addition, these materials are extremely robust, both chemically and physically, which allows the antenna to acquire great resistance to pressure and temperature.

From a high-frequency point of view, it is also advantageous if the second end face of the high-frequency waveguide, which is opposite the first end face with respect to the waveguide axis, reflects the high-frequency signal with a phase jump of 180°. If the high-frequency waveguide is manufactured based on a dielectric material, a corresponding phase jump at the second end face can be realized, for example, when the second end face of the high-frequency waveguide is provided with metallization. In the event that the high-frequency waveguide is designed as a hollow conductor, a corresponding phase jump can be achieved through a conductive design of the second end face.

Provided that the coupling out and in of the high-frequency signal between the antenna and the medium is optimal, this can maximize the sensitivity of the dielectric value measurement. Therefore, it is advantageous if the antenna has a cutoff frequency that is at least 10% lower than the (lowest) frequency of the high-frequency signal. The parameter primarily to be optimized in this regard is the cross section of the high-frequency waveguide. The distance between the feedthrough and the second end face in the high-frequency waveguide should preferably be selected in such a way that it corresponds to a quarter of the wavelength of the high-frequency signal. In combination with the phase jump of 180° at the second end face of the high-frequency waveguide, this results in positive interference of the high-frequency signal in the high-frequency waveguide, which maximizes coupling the high-frequency signal into or out of the high-frequency waveguide.

The resulting capacitance of the coaxial conductor between the feedthrough in the high-frequency waveguide and the conductor termination is optimally designed in such a way that it compensates for the parasitic capacitance of the high-frequency waveguide. In this regard, it is also advantageous if the conductor termination of the coaxial conductor is designed in such a way that the high-frequency signal to be coupled in or tapped is reflected there without a phase jump (for example, by means of a cavity between the coaxial conductor and the carrier body).

Simple fabrication of the antenna according to the invention is possible, in particular, if the high-frequency waveguide is fixed in the carrier body by means of a screw insert, which can be screwed into the carrier body via the conductor termination in the direction of the coaxial conductor. A correspondingly simple method for manufacturing the antenna comprises the following method steps:

- providing the high-frequency waveguide, the coaxial conductor and the carrier body,
- inserting the high-frequency waveguide into the carrier body through a corresponding opening in the carrier body for the first end face of the high-frequency waveguide,
- inserting the coaxial conductor into the feedthrough of the high-frequency waveguide, and
- fixing the high-frequency waveguide and/or the coaxial conductor by screwing the screw insert into the carrier body.

A high-frequency based measuring device for determining a dielectric value of a medium can be realized on the basis of the antenna according to the invention. For this purpose, the measuring device comprises the following components:

- at least one antenna according to one of the previously mentioned embodiment variants in order to transmit the high-frequency signal toward the medium, and/or to receive the high-frequency signal after interacting with the medium,
- a signal generation unit that is connected to the connection means for the transmitting antenna to generate the high-frequency signal to be transmitted, if necessary via a transmit/receive switch, and
- an evaluation unit, which is connected—again possibly via the transmit/receive switch—to the connection means for the receiving antenna, in order to determine the dielectric value on the basis of the received high-frequency signal.

In the context of the invention, the term "interaction" refers either to transmission through the medium along a defined measurement path (i.e., between the transmitting antenna and the receiving antenna), or to reflection off the medium.

The evaluation unit can determine the dielectric value of the medium as a complex value, at least in the case of the transmittive measurement principle, on the basis of an amplitude, a phase or a signal propagation time for the received high-frequency signal. In this context, the term "unit" within the scope of the invention is understood to mean, in principle, any electronic circuit that is suitably designed for the intended use. Depending on the requirement, it can therefore be an analog circuit for generating or processing corresponding analog signals. However, it can also be a digital circuit, such as an FPGA or a storage medium in cooperation with a program. The program is designed to carry out the corresponding method steps or to apply the necessary computing operations for the respective unit. In this context, different electronic units for the measuring device in the sense of the invention can also potentially access a common physical memory or be operated by means of the same physical digital circuit.

BRIEF DESCRIPTION OF THE DRAWINGS

The invention will be explained in more detail with reference to the following figures. The following are shown.

DETAILED DESCRIPTION

Figure 2:
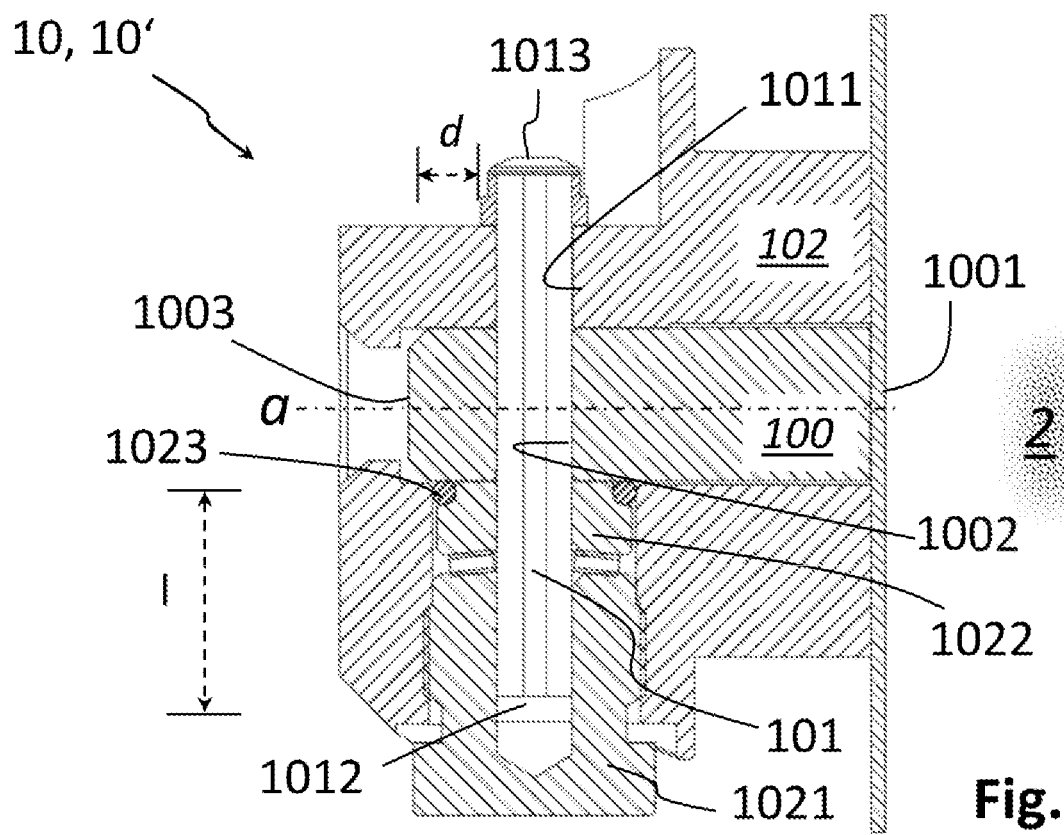
FIG. 2 shows a cross-sectional view of the antenna according to the present disclosure for high-frequency-based dielectric value measurement.

A cross-sectional view of a pipeline section 3 is illustrated in FIG. 2 for general understanding of transmitted dielectric value measurement. A gaseous medium 2, such as propane, nitrogen, etc., or a liquid medium 2, such as fuel, beverages, or wastewater with solid-like sediments, flows through the pipeline section 3. In this context, the dielectric value DK of the medium 2 is to be determined. To this end, a transmitting antenna 10 and a receiving antenna 10' are arranged opposite one another on the inner wall of the pipeline section 3 and are aligned with one another. The transmitting antenna 10 is used to transmit high-frequency signals $S_{HF}$ toward the medium 2, while the receiving antenna 10' receives the high-frequency signals $E_{HF}$ after having passed through the resulting measurement path.

Figure 1:
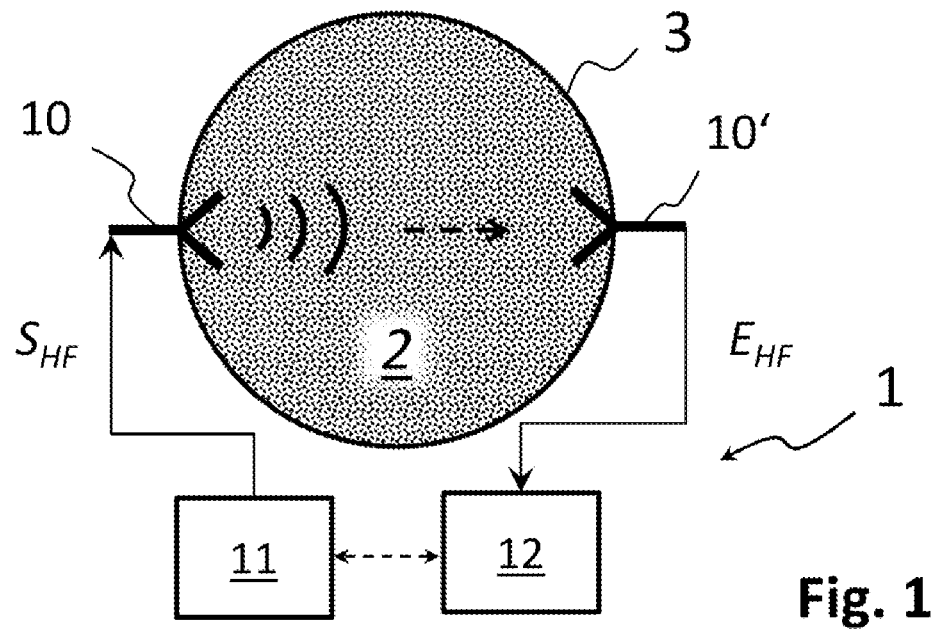
FIG. 1 shows a high-frequency-based dielectric value measuring device on a pipeline section.

The high-frequency signal $S_{HF}$ is generated by a correspondingly designed signal generation unit 12, which is connected to the transmitting antenna 10 for this purpose. Based on the received signal $E_{HF}$, the dielectric value measuring device 1 in turn determines the dielectric value DK of the medium 2. For this purpose, an evaluation unit 12 of the dielectric value measuring device 1 is connected to the receiving antenna 10' in order to detect the phase, the signal propagation time and/or the amplitude of the received signal $E_{HF}$. From this, the evaluation unit 12 can, for example, in turn determine the dielectric value DK of the medium 2 on the basis of corresponding calibration data. So that the phase or amplitude can also be determined relative to the high-frequency signal $S_{HF}$ to be transmitted, the evaluation unit 12 is correspondingly connected to the signal generation unit 11 if required, as shown in FIG. 1. In this case, the signal generation unit 11 in the dielectric value measuring device 1 shown in FIG. 1 can, for example, be based on a PLL ("phase locked loop"). In this context, the signal generation unit 11 and the evaluation unit 12 can, for example, be designed together as a network analyzer.

As an alternative to the embodiment of the dielectric value measuring device 1 shown in FIG. 1, one of the antennas 10, 10' for the dielectric value measuring device 1 can also be designed as a combined transmit/receive antenna, while a reflector for the high-frequency signal $S_{HF}$, $E_{HF}$ is attached at the location for the other antenna 10, 10'. In this case, the signal generation unit 11 and evaluation unit 12 are each connected separately via a transmit/receive switch to the transmit/receive antenna. In another variation thereof, the reflector can also be dispensed with so that it is not the transmitted component $E_{HF}$ that is determined by the evaluation unit 12 via the combined transmit/receive antenna, but rather the component of the generated high-frequency signal $S_{HF}$ that is reflected at the transmit/receive antenna. Analogous to the transmittive method, in the case of this reflective method, the dielectric value of the medium 2 can be determined via the reflected component of the generated high-frequency signal $S_{HF}$.

FIG. 2 shows an antenna structure according to the invention, which can be designed compactly, is easy to produce and allows a large resistance to pressure and temperature. The core of the antenna structure shown there, which can be used both as a transmitting antenna 10 and as a receiving antenna 10', is a high-frequency waveguide 100 in which the high-frequency signal $S_{HF}$ to be transmitted and the high-frequency signal $E_{HF}$ to be received can be transmitted along a rectilinear waveguide axis a. Toward the medium 2, the high frequency waveguide 100 is terminated by a first end face 1001. So that the high-frequency signal $S_{HF}$ to be transmitted can be coupled into the medium 2 via the first end face 1001 with low loss, or so that the high-frequency signal $E_{HF}$ to be received can be coupled into the high-frequency waveguide 100 with low loss, the first end face 1001 has an orientation that is approximately orthogonal to the waveguide axis a. The cross-sectional shape (for example round or rectangular) and the cross-sectional dimensions of the high-frequency waveguide 100 along the waveguide axis a are optimized to the frequency of the high-frequency signal $S_{HF}$, $E_{HF}$.

In the embodiment shown in FIG. 2, the high-frequency waveguide 100 is made from a dielectric material. In this case, the high-frequency waveguide 100 can be dimensioned with smaller dimensions, the higher the permittivity of the dielectric material at the corresponding frequency of the high-frequency signal $S_{HF}$, $E_{HF}$. Materials suitable for this purpose, which have a permittivity greater than two and which additionally have a reliable pressure and/or temperature resistance, are titanium oxide, aluminum oxide or zirconium oxide, for example. Optionally, with the exception of the first end face 1001, the HF waveguide 100 can be provided on the outside with metallization in order to further improve the transmission within the high-frequency waveguide 100. In this context, it is advantageous if the second end face 1003 of the high-frequency waveguide 100, which is opposite the waveguide axis a of the first end face 1001, reflects the high-frequency signal $S_{HF}$, $E_{HF}$ with a phase jump of 180°.

In terms of high frequency, the high frequency waveguide 100 is driven by the signal generation unit 11 or by the evaluation unit 12 via a coaxial electrical conductor 101, such as a coaxial cable. Via this coaxial conductor 101, the signal generation unit 11 can couple the high-frequency signal $S_{HF}$ to be transmitted into the high-frequency waveguide 100, or the evaluation unit 12 can tap the received high-frequency signal $E_{HF}$ via the coaxial conductor 101. For this purpose, a continuous feedthrough 1002 is let into the high-frequency waveguide 100 at right angles to the waveguide axis a, the diameter of which is matched to the outer diameter of the coaxial conductor 101. In this case, the outer conductor 1011 for the coaxial conductor 101 is electrically connected to the high-frequency waveguide 100. The inner conductor for the coaxial conductor 101 extends through feedthrough 1002 up to the conductor termination 1012 for the coaxial conductor 101. In this case, the feedthrough 1002 is optimally attached in such a way that the distance d for the second end face 1003 of the high-frequency waveguide 100 to the coaxial conductor 101 corresponds to a quarter of the wavelength of the high-frequency signal $S_{HF}$, $E_{HF}$. In conjunction with the phase jump of 180° at the second end face 1003, this optimizes transmission in the high-frequency waveguide 100.

On the end side, the coaxial conductor 101 has a connection means 1013, such as a bayonet connection for high-frequency connection of the respective unit 11, 12 to the coaxial conductor 101 or to the antenna 10, 10'. The conductor termination 1012 for the coaxial conductor 101, which is opposite the connection means 1013 on the coaxial conductor 101, is designed in such a way that the high-frequency signal $S_{HF}$, $E_{HF}$ to be coupled in or tapped is reflected there without phase jump. In the embodiment shown in FIG. 2, the coaxial conductor 101 is designed as an open conductor end for this purpose. In addition, the coaxial conductor 101 is guided through the feedthrough 1002 in such a way that the conductor termination 1012 does not terminate flush with the feedthrough 1002, but in such a way that the conductor termination 1012 projects beyond the feedthrough 1002 with a defined excess length l. Thus, a defined capacitance C can be assigned to the coaxial conductor 101 between the feedthrough 1002 and the conductor termination 1012. In this case, the capacitance C is measured according to the parasitic capacitance of the high-frequency waveguide 100.

In order to maximize the coupling out and coupling in of the high frequency signal $S_{HF}$, $E_{HF}$ from or into the antenna 10, 10', it is also advantageous to set the cutoff frequency of the antenna 10, 10' in such a way that the cutoff frequency is at least 10% lower than the (lowest) frequency for the high frequency signal $S_{HF}$, $E_{HF}$. The primary relevant parameter in this context is the cross-sectional geometry of the high-frequency waveguide 100 in relation to the waveguide axis a. In addition, the overall length of the high-frequency waveguide 100 along the axis a, i.e. between the first end face 1001 and the second end face 1003 of the high-frequency waveguide 100, must also be designed in such a way that the high-frequency coupling between the coaxial conductor 101 and the high-frequency waveguide 100 is at a maximum.

As shown in FIG. 2, the high-frequency waveguide 100 and the coaxial conductor 101 are enclosed by a carrier body 102 with the exception of the connection means 1013 and with the exception of the first face surface 1001. In this case, the carrier body 102 surrounds the HF waveguide 100 in a form-fitting manner up to the second end face 1003 of the high-frequency waveguide 100 for which a defined cavity is formed. In this case, the cavity is provided for permanently fixing the high-frequency waveguide 100 by means of adhesive. The coaxial conductor 101 also encloses the carrier body 102 in a form-fitting manner up to the length l between the feedthrough 1002 and the conductor termination 1012. Given the, in principle, form-fitting design of the carrier body 102, the antenna 10, 10' can seal the respective opening of the pipeline section 3, on which the antenna 10, 10' is attached, against overpressure.

In the finished state of the antenna 10, 10', the high-frequency waveguide 100 is initially fixed in the carrier body 102 exclusively by means of a screw insert 1021. As can be seen from FIG. 2, the carrier body 102 and the screw insert 1021 are provided for this purpose by means of a corresponding thread in such a way that the screw insert 1021 can be screwed into the carrier body 102 via the conductor termination 1012 in the direction of the coaxial conductor 101. As a result, when in a screwed state, the screw insert 1021 presses the high-frequency waveguide 100 via a spring element 1022 orthogonally to the waveguide axis a against the carrier body 102. Additional adhesive may be introduced into the cavity behind the second end face 1003 to permanently fix the high-frequency waveguide 100. In this case, a sealing ring 1023 around the coaxial conductor 101 is additionally arranged between the spring element 1022 and the high-frequency waveguide 100 for sealing against the medium 2 or the adhesive. However, to manufacture the antenna 10, 10', the high-frequency waveguide 100 must first be inserted via a corresponding opening in the carrier body 102 for the first end face 1001, which is directed towards the medium 2 in the assembled state, before screwing in. In addition, the coaxial conductor 101 must be inserted into the feedthrough 1002 for the high-frequency waveguide 100, wherein this can take place before or after screwing-in the screw insert 1021. Overall, the antenna 10; 10' can therefore be produced in a few manufacturing steps.

The invention claimed is:

1. An antenna for transmitting and/or receiving high-frequency signals, comprising: a high-frequency waveguide via which the high-frequency signal can be transmitted along a waveguide axis, the high-frequency waveguide having a first end face oriented orthogonally to the waveguide axis for transmitting and receiving the high-frequency signal to and from a medium and a feedthrough extending orthogonally to the waveguide axis; and a coaxial conductor for coupling the high-frequency signal to be transmitted into the high-frequency waveguide or for tapping a received high-frequency signal, the coaxial conductor having: an electrical outer conductor electrically connected to the high frequency waveguide; a conductor termination designed such that the high-frequency signal to be coupled or tapped is reflected at the conductor termination; and a connection means opposite the conductor termination for high-frequency contacting of the antenna, wherein the coaxial conductor is led through beyond the feedthrough such that the coaxial conductor forms a defined capacitance between the feedthrough and the conductor termination.

2. The antenna according to claim 1, further comprising: a carrier body that encloses the high-frequency waveguide and the coaxial conductor at least between the feedthrough and the conductor termination.

3. The antenna according to at least one of claim 2, wherein the high-frequency waveguide is fixed in the carrier body by means of a screw insert that can be screwed into the carrier body via the conductor termination in a direction of the coaxial conductor.

4. The antenna according to claim 1, wherein the high-frequency waveguide is designed as a waveguide or as a dielectric waveguide.

5. The antenna according to claim 4, wherein the high-frequency waveguide is made from TiOx, AlOx, or ZrOx which, at a corresponding frequency of the high-frequency signal, has a permittivity of at least 2, provided that the high-frequency waveguide is designed as a dielectric waveguide.

6. The antenna according to claim 5, wherein the high-frequency waveguide is coated with an electrical coating except for the first end face if the high-frequency waveguide is designed as a dielectric waveguide.

7. The antenna according to claim 1, wherein the high-frequency waveguide further has a second end face that is opposite the waveguide axis for the first end face and reflects the high-frequency signal with a phase jump of 180°.

8. The antenna according to claim 7, wherein a distance between the feedthrough and the second end face is a quarter of the wavelength of the high-frequency signal.

9. The antenna according to claim 1, wherein a cross section of the high-frequency waveguide is dimensioned such that the antenna has a cutoff frequency that is at least 10% lower than a frequency of the high-frequency signal.

10. The antenna according to claim 1, wherein the conductor termination for the coaxial conductor is designed such that the high-frequency signal to be coupled in or tapped is reflected there without a phase jump.

11. A method for manufacturing an antenna, comprising:
providing a high-frequency waveguide, a coaxial conductor, and a carrier body;
inserting the high-frequency waveguide into the carrier body through a corresponding opening in the carrier body for a first end face of the high-frequency waveguide;
inserting the coaxial conductor into the feedthrough for the high-frequency waveguide; and
fixing the high-frequency waveguide and/or the coaxial conductor by screwing a screw insert into the carrier body.

12. A method for manufacturing an antenna, comprising: providing a high-frequency waveguide, a coaxial conductor, and a carrier body; inserting the high-frequency waveguide into the carrier body through a corresponding opening in the carrier body for a first end face of the high-frequency waveguide; inserting the coaxial conductor into a feedthrough for the high-frequency waveguide; and fixing the high-frequency waveguide and/or the coaxial conductor by screwing a screw insert into the carrier body.

13. The high-frequency based measuring device according to claim 12, wherein the evaluation unit is designed to determine the dielectric value on the basis of an amplitude, a phase, or a signal propagation time for the received high-frequency signal.

\* \* \* \* \*